US009447990B2

(12) United States Patent
Zuritis

(10) Patent No.: US 9,447,990 B2
(45) Date of Patent: Sep. 20, 2016

(54) SOLAR ARRAY SUPPORT STRUCTURE WITH A TELESCOPIC WIND BRACE

(76) Inventor: Michael Zuritis, Ballston Lake, NY (US)

(*) Notice: Subject to any disclaimer, the term of this patent is extended or adjusted under 35 U.S.C. 154(b) by 1259 days.

(21) Appl. No.: 13/248,702

(22) Filed: Sep. 29, 2011

(65) Prior Publication Data

US 2012/0090665 A1 Apr. 19, 2012

(51) Int. Cl.
*A47G 29/02* (2006.01)
*F24J 2/52* (2006.01)
*H01L 31/042* (2014.01)
*H02S 20/10* (2014.01)

(52) U.S. Cl.
CPC ............... *F24J 2/5232* (2013.01); *F24J 2/526* (2013.01); *H02S 20/00* (2013.01); *H02S 20/10* (2014.12); *F24J 2/5264* (2013.01); *Y02E 10/47* (2013.01); *Y02E 10/50* (2013.01)

(58) Field of Classification Search
CPC ........ F24J 2/5232; F24J 2/526; F24J 2/5264; H02S 20/00; H02S 20/10; Y02E 10/50; Y02E 10/47
USPC ............. 248/148, 200.1, 235, 238; 52/173.3, 52/616, 655.1, 698; 126/569
See application file for complete search history.

(56) References Cited

U.S. PATENT DOCUMENTS

| 5,158,023 | A * | 10/1992 | Allen .............................. 108/42 |
| 5,524,854 | A * | 6/1996 | McSwain et al. ......... 248/354.1 |
| 6,634,150 | B1 * | 10/2003 | Oliver et al. ................... 52/292 |
| 8,539,724 | B2 * | 9/2013 | Bullivant et al. ............ 52/173.3 |
| 2009/0223142 | A1 * | 9/2009 | Shingleton et al. .............. 52/71 |
| 2011/0067749 | A1 * | 3/2011 | Zuritis .......................... 136/246 |

* cited by examiner

*Primary Examiner* — Gwendolyn Baxter
(74) *Attorney, Agent, or Firm* — Schmeiser, Olsen & Watts, LLP

(57) ABSTRACT

Disclosed herein is a solar array structure that includes a first vertical column having a first height and a second vertical column having a second height, the second height being taller than the first height. The solar array support structure further includes a first horizontal beam attached to and extending across a top of the first vertical column and a second horizontal beam attached to and extending across a top of the second vertical column. The solar array support structure further includes at least one solar panel attached above the first horizontal beam and the second horizontal beam in a plane that extends between the first horizontal beam and the second horizontal beam. Finally, the solar array support structure further includes a telescopic wind brace extending between an upper portion of the first vertical column and a lower portion of the second vertical column.

21 Claims, 11 Drawing Sheets

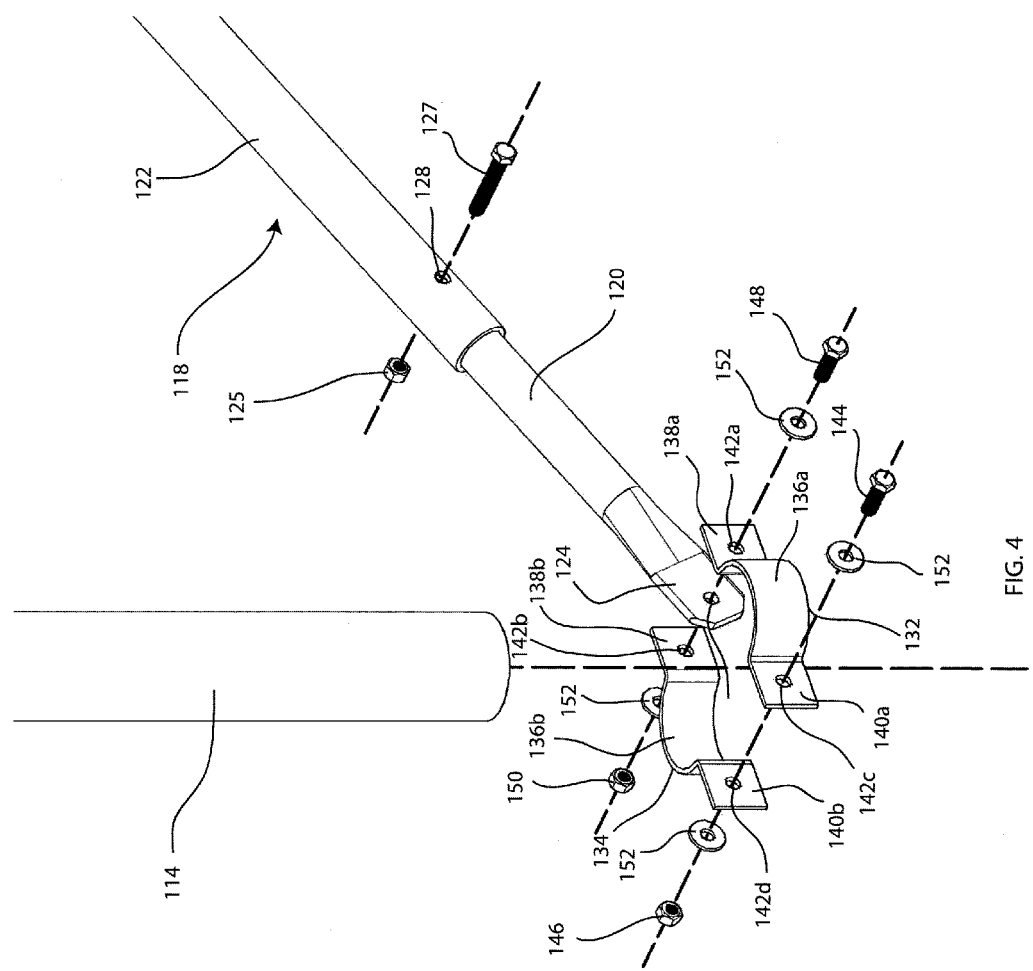

SOLAR ARRAY SUPPORT STRUCTURE WITH A TELESCOPIC WIND BRACE

FIELD OF THE TECHNOLOGY

The subject matter disclosed herein relates generally to solar arrays. More particularly, the subject matter relates to a solar array support structure with a telescopic wind brace.

BACKGROUND

Renewable energy sources are becoming more popular with the rising cost of oil and other non-renewable energy resources. Solar energy is one of these renewable energy sources and has proven desirable to harness in many circumstances. One method of harnessing solar energy is to install a structural array of solar panels, or a solar array, such that the solar panels each face the sun to achieve sunlight absorption. An example prior art solar array 10 is shown in FIGS. 1A-1C. The solar array 10 includes two sets of vertical columns 12 that extend from the ground 13. Each set of vertical columns 12 is generally attached with a horizontal beam 14. Rails 16 may be secured above the horizontal beams 14 at a predetermined appropriate angle to maximize sunlight absorption. Solar panels 18 are then attached to the rails 16 at this predetermined angle.

Due to the angle at which the plane of solar panels 18 rests, the typical prior art solar array 10 may often be subject to significant loading caused by the wind. To support this loading, the typical prior art solar array 10 includes diagonal wind braces 20. These wind braces 20 extend between the two sets of vertical columns 12 at a diagonal angle that is substantially perpendicular to the angle of the plane of solar panels 18. These wind braces 20 must be fashioned to a particular length depending on the spacing of the vertical columns 12, and the angle at which they are to extend between the vertical columns 12. Because these dimensions vary with each new solar array construction, the dimensions of the wind braces 20 also vary with each solar array construction. These wind braces 20 must generally be cut to the appropriate length in the field, requiring significant effort and preparation equipment.

Thus, a solar array support structure with a telescopic wind brace would be well received in the art.

BRIEF DESCRIPTION

According to one aspect, a solar array support structure comprises: a first vertical column having a first height; a second vertical column having a second height, the second height being taller than the first height; a first horizontal beam attached to and extending across a top of the first vertical column; a second horizontal beam attached to and extending across a top of the second vertical column; at least one solar panel attached above the first horizontal beam and the second horizontal beam in a plane that extends between the first horizontal beam and the second horizontal beam; and a telescopic wind brace extending between an upper portion of the first vertical column and a lower portion of the second vertical column.

According to another aspect, a solar array support structure comprises: a first set of vertical columns each having a first height and aligned in a first row; a second set of vertical columns each having a second height and aligned in a second row, the second height being taller than the first height; a first horizontal beam extending across a top of the first set of vertical columns; a second horizontal beam extending across a top of the second set of vertical columns; a solar array mounted above the first horizontal beam and the second horizontal beam in a plane that extends between the first horizontal beam and the second horizontal beam; and a plurality of wind braces mounted between the first set of vertical columns and the second set of vertical columns having a length, the plurality of wind braces each having a means for releasably and securably adjusting the length.

According to another aspect, a solar array support structure comprises: a first vertical column; a second vertical column; and a telescopic brace located between the first vertical column and the second vertical column, the telescopic wind brace having a first stamped end and a second stamped end, each of the first and second stamped ends including a stamped end opening, the telescopic wind brace including a first tubular portion and a second tubular portion each having a length with a circular cross section, the first tubular portion having smaller dimensions than the second tubular portion such that the first tubular portion is slidably insertable within the second tubular portion.

BRIEF DESCRIPTION OF THE DRAWINGS

The subject matter which is regarded as the invention is particularly pointed out and distinctly claimed in the claims at the conclusion of the specification. The foregoing and other features and advantages of the invention are apparent from the following detailed description taken in conjunction with the accompanying drawings in which:

FIG. 4 depicts an exploded view of the telescopic wind brace of FIG. 3 connecting to a vertical column of the solar array support structure of FIGS. 2A and 2B accordance with one embodiment;

DETAILED DESCRIPTION

A detailed description of the hereinafter described embodiments of the disclosed apparatus and method are presented herein by way of exemplification and not limitation with reference to the Figures.

Figure 2A:
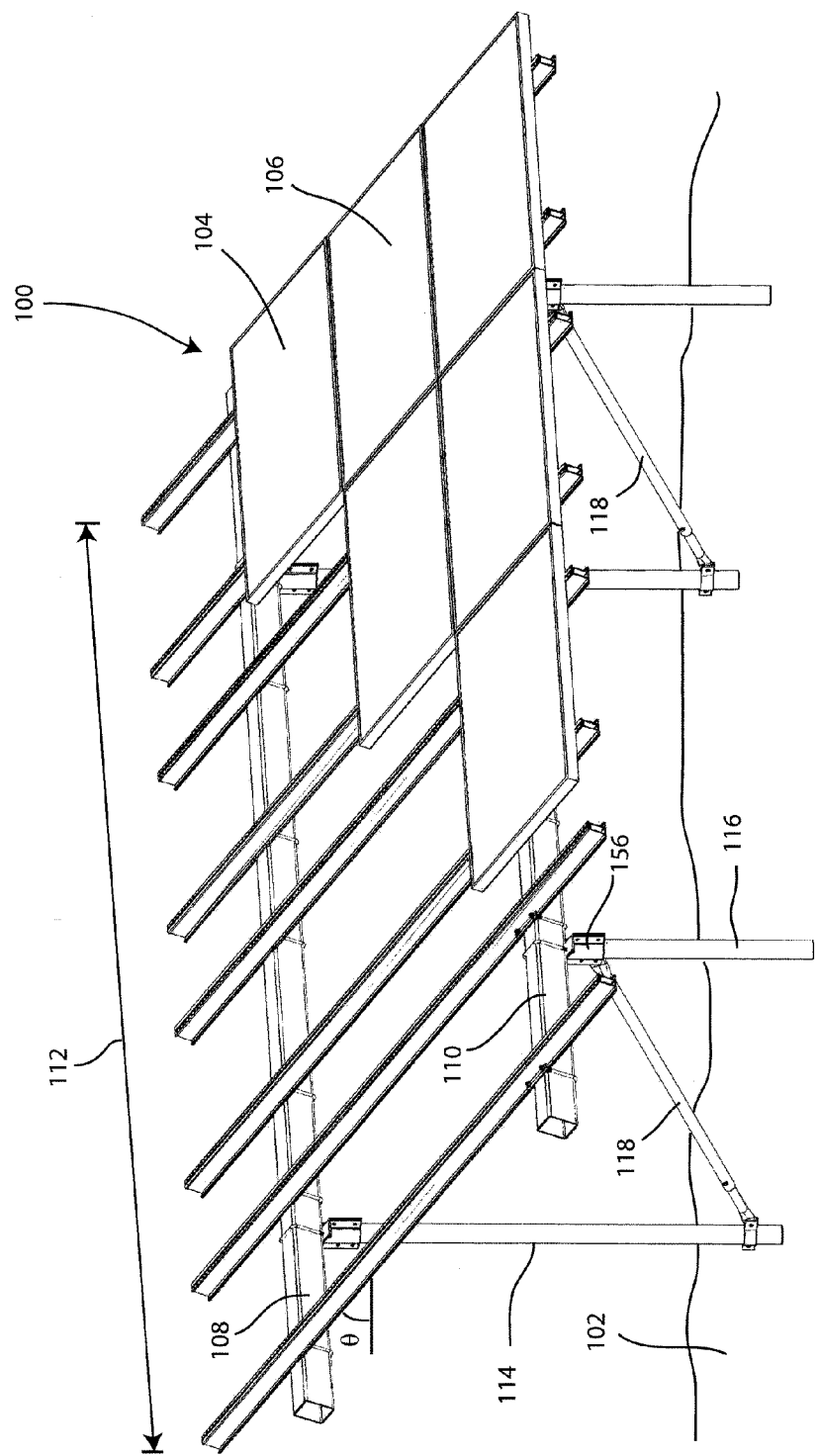
FIG. 2A depicts a perspective view of a front side of a solar array support structure in accordance with one embodiment.
Figure 2B:
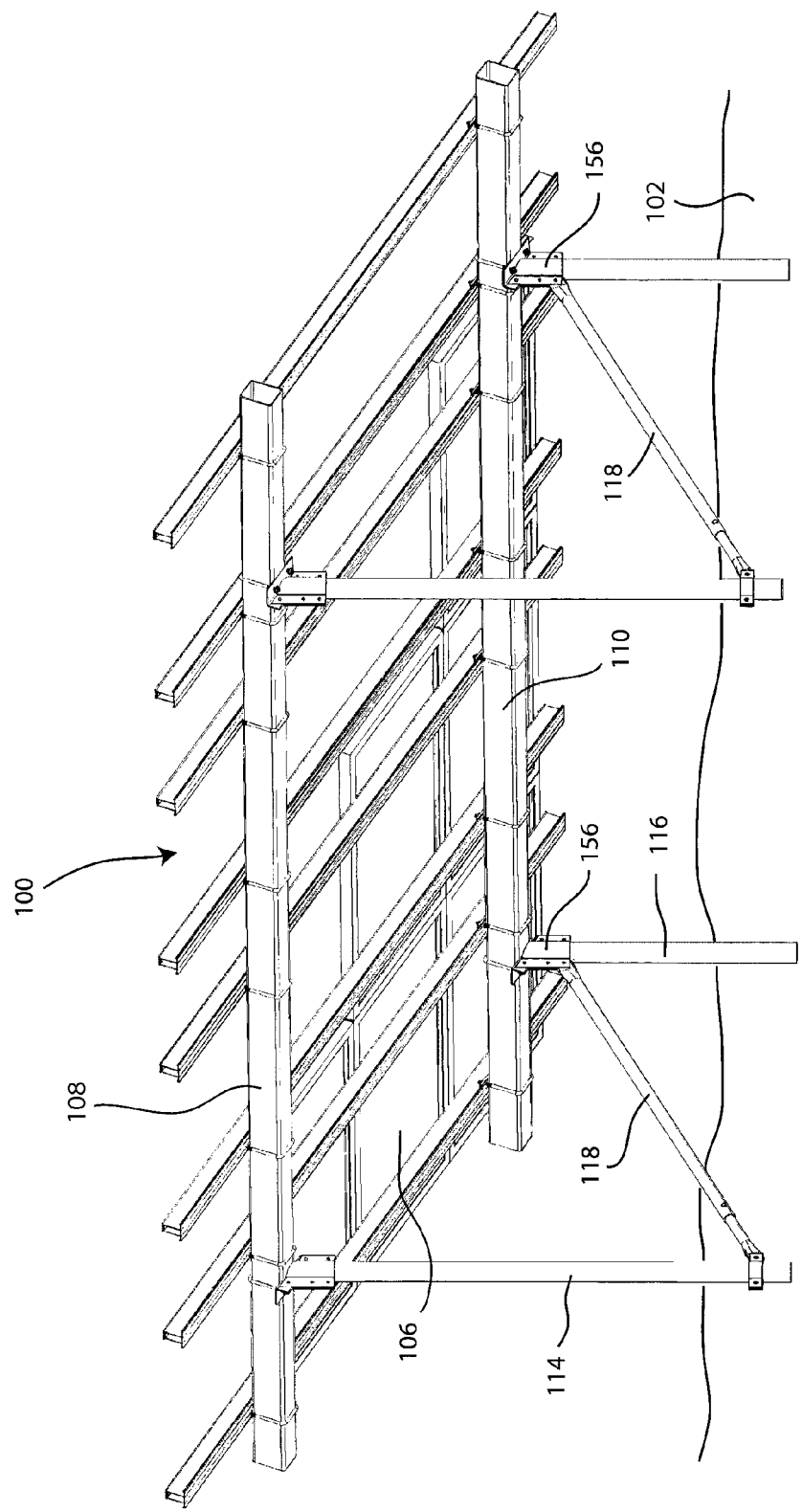
FIG. 2B depicts a perspective view of a back side of the solar array support structure of FIG. 2A in accordance with one embodiment.

Referring firstly to FIGS. 2A and 2B, a solar array support structure 100 is shown according to one described embodiment, after having been installed in the ground 102 and having a partial array 104 of solar panels 106 mounted thereon. The solar array support structure 100 is configured to receive the solar panels 106 such that the solar panels 106 are each tilted at a predetermined angle θ that may maximize sunlight absorption. The solar array support structure 100 comprises a top horizontal beam 108 and a bottom horizontal beam 110 running a length 112 of the solar array support structure 100. A plurality of rear support columns 114 extend substantially vertically from the top horizontal beam 108 while a plurality of front support columns 116 extend substantially vertically from the bottom horizontal beam 110. These vertical columns 114, 116 are installed into the ground 102 such that the solar array support structure 100 is secured therein. The front vertical support columns 116 may have a first height and the rear vertical support columns 114 may have a second height that is taller than the first height to achieve the tilted predetermined angle θ of the solar panels 106. The solar array support structure 100 further includes a plurality of diagonal wind braces 118 that extend between the two sets of vertical columns 114, 116. Each wind brace 118 extends diagonally between an upper portion of one of the front vertical support columns 116 to a lower portion of one of the rear vertical support columns 114. The wind braces 118 may each be telescopic such that the length of each of the wind braces is adjustable during installation of the solar array support structure 100.

Figure 3:
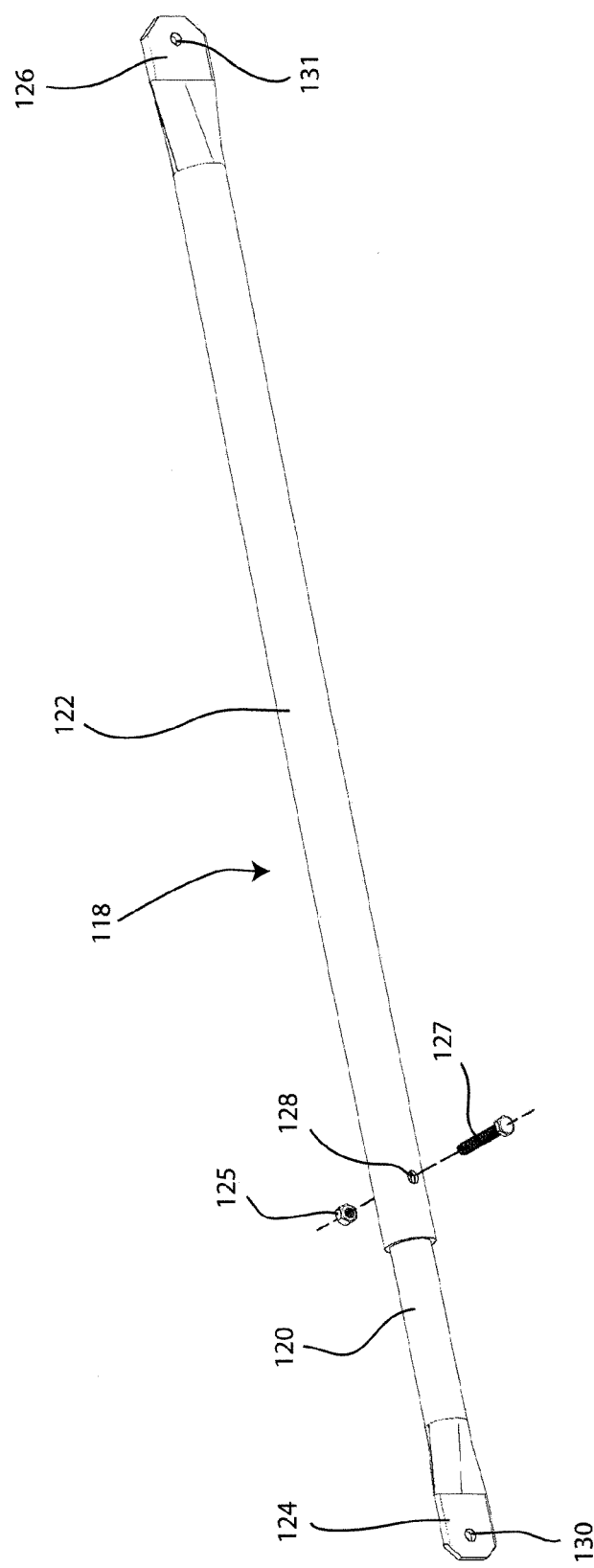
FIG. 3 depicts an exploded view of a telescopic wind brace in accordance with one embodiment.

Referring now to FIG. 3, a perspective view of one of the telescopic wind braces 118 is shown. The telescopic wind brace 118 may include a first tubular portion 120 and a second tubular portion 122. The first tubular portion 120 and the second tubular portion 122 of the wind brace 118 may be manufactured from aluminum, steel, stainless steel, or other like materials. Both the first tubular portion 120 and the second tubular portion 122 are shown having a generally circular cross section. The first tubular portion 120 has a smaller circumference than the second tubular portion 122 to allow for the first tubular portion 120 to be slidably insertable within the second tubular portion 122. However, in other embodiments the second tubular portion 122 may have a smaller circumference than the first tubular portion 120. While the embodiment shown in the Figures includes a circular cross section, other embodiments are contemplated. For example, the first and second portions 120, 122 of the telescopic wind brace 118 may have a rectangular, square or triangular cross section. Whatever the embodiment, the dimensions of the first portion 120 may be smaller than the dimensions of the second tubular portion 122 in order to allow for the first portion 120 to be slidably inserted into the second portion 122 in order to adjust the length of the wind brace 118. In the embodiment shown, the second tubular portion 122 comprises a majority of the length of the wind brace 118. However, in other embodiments, the smaller circumference first tubular portion 120 may be exposed for a majority of the length of the wind brace 118 and the second tubular portion 122 may extend a smaller length of the wind brace 118.

A threaded nut 125 and bolt 127 arrangement may retain the first tubular portion 120 within the second tubular portion 122 at a particular desirable length. To accomplish this, the first tubular portion 120 may include one or more first pairs of openings. These first pairs of openings are not shown because they are covered by the second tubular portion 122. The first tubular portion 120 may be pre-made to include several openings to allow for the length of the wind brace 118 to be increased or decreased as necessary during construction of the solar array support structure 100. One of the first pairs of openings of the first portion 120 may then align with a second pair of openings 128 of the second tubular portion 122. The bolt 127 may then be inserted through each of the first and second pairs of openings 128. Once the bolt 127 is inserted such that it extends through both pairs of openings 128 to the other side of the tubular portions 120, 122, the nut 125 may be screwed onto the threaded end of the bolt 127 in order to retain the bolt 127 in place and retain the wind brace 118 at the desirable length. It should be understood that washers (not shown) may also be utilized with the nut 125 and bolt 127 arrangement.

The first tubular portion 120 of the telescopic wind brace 118 may further include a first stamped end 124 and the second tubular portion 122 may include a second stamped end 126. The first stamped end 124 may include a first stamped end opening 130 and the second stamped end 126 may include a second stamped end opening 131. The stamped ends 124, 126 may be prefabricated prior to installation of the solar array support structure 100 in the field. Thus, no cutting or stamping of the wind braces 118 may be necessary to install the wind braces 118 between the front and rear support columns 114, 116.

Referring now to FIG. 4, an exploded view is shown of the connection between the wind brace 118 and the rear support column 114. The wind brace 118 may be connected to the rear support column 114 with a first connector half 132 and a second connector half 134. The connector halves 132, 134 may each be made of aluminum, steel, stainless steel, or another similar material. Each of the connector halves 132, 134 includes a semi-annular portion 136a, 136b extending between a first radial flange 138a, 138b and a second radial flange 140a, 140b. The radial flanges 138, 140 each extend radially outwardly from the semi-annular portion 136. Further, each radial flange 138a, 138b, 140a, 140b includes a radial flange opening 142a, 142b, 142c, 142d.

To assemble the wind brace 118 to the rear support column 114, the connector halves 132, 134 may be placed around the rear support column 114 at the appropriate height of the rear support column 114 such that the rear support column 114 extends through the circular opening made by the corresponding semi-annular portions 136a, 136b. The first stamped end 124 may then be placed between the first radial flanges 138a, 138b of the two connector halves 132, 134 such that the first stamped end opening 130 aligns with the openings 142a, 142b. A first flange bolt 144 may be inserted through the openings 142c, 142d of the second radial flanges 140a, 140b and a first flange nut 146 may be screwed onto the threads of the first flange bolt 144. A second flange bolt 148 may the be inserted through the openings 142a, 142b of the first radial flanges 138a, 138b and the first stamped end opening 130 of the first stamped end 124 and a second flange nut 150 may be screwed onto the threads of the second flange bolt 148. Further, washers 152 may be utilized to distribute the load from the bolts 144, 148 and the nuts 146, 150.

It should be understood that the connection means of the wind brace 118 to the front vertical support column 116 may be similar to the connection of the wind brace 118 connecting to the rear vertical support column 114 as described hereinabove. However, rather than utilizing the connector halves 132, 134, the wind brace 118 may be connected to a column end cap 156, as shown in FIGS. 2A and 2B. The column end cap 156 may function both to connect to the second stamped end 126 and also to connect the front vertical support column 116 with the bottom horizontal beam 110. In other embodiments, the second stamped end 126 may be connected to the top portion of the front vertical support column 116 with a second pair of connector halves that are similar to the first pair of connector halves 132, 134. Thus, the second pair of connector halves may each include a semi-annular portion extending between two radial flanges each having a radial flange opening. The second stamped end 126 may be connected with bolts and nuts, as described hereinabove with the first stamped end 124.

Figure 1A:
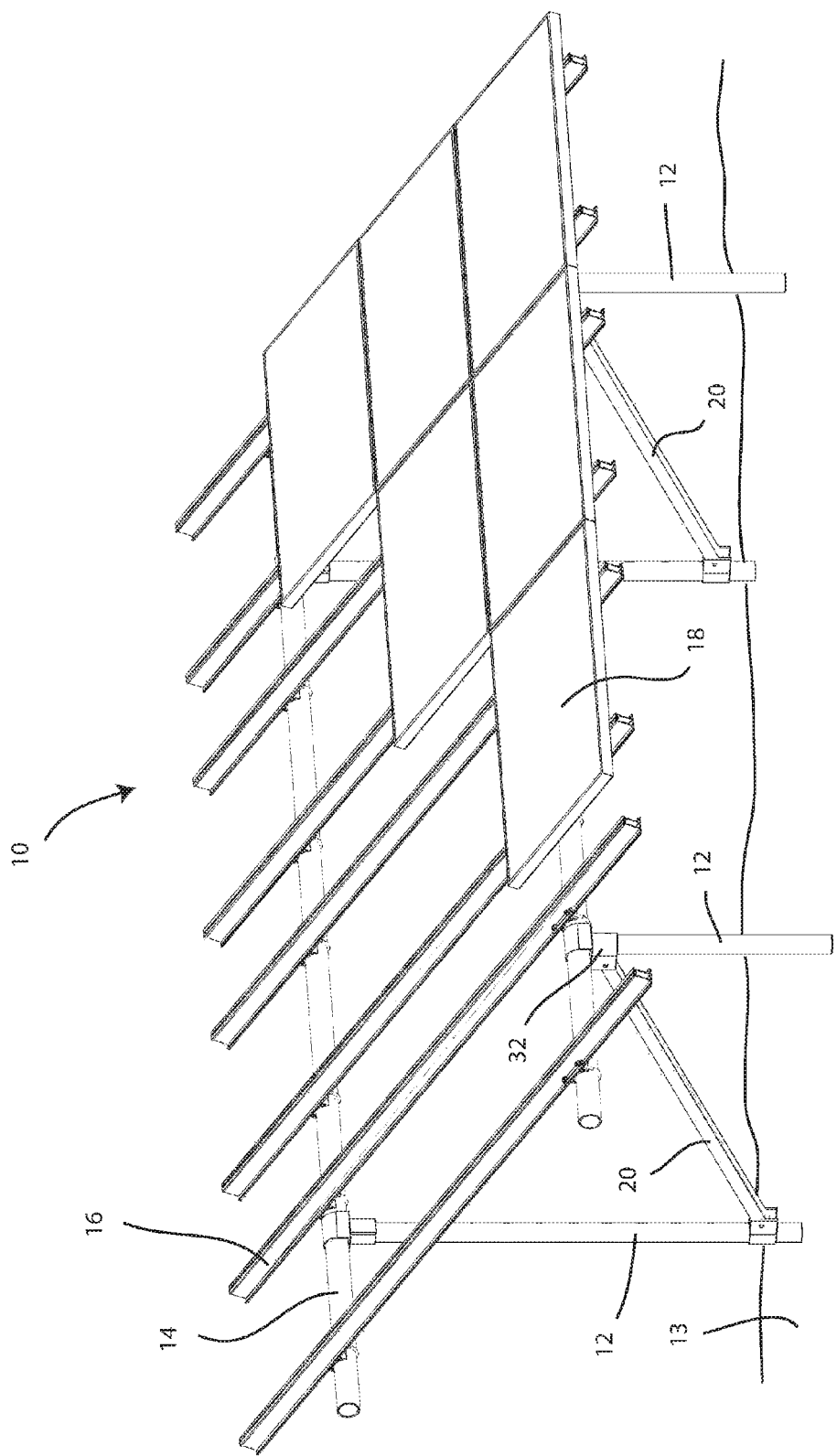
FIG. 1A depicts a perspective view of a front side of a prior art solar array support structure.
Figure 1B:
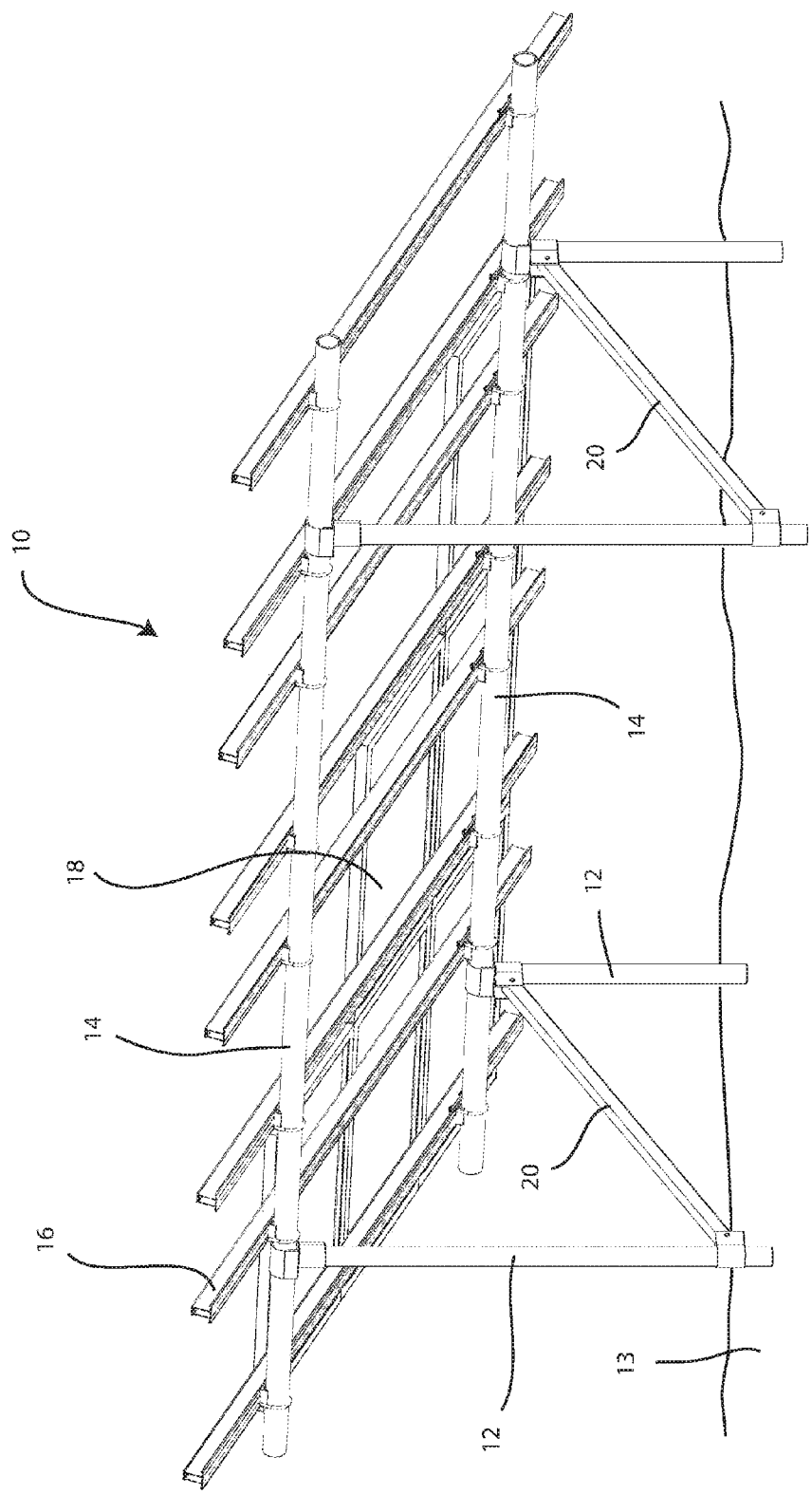
FIG. 1B depicts another perspective view of a back side of the prior art solar array support structure of FIG. 1A.
Figure 1C:
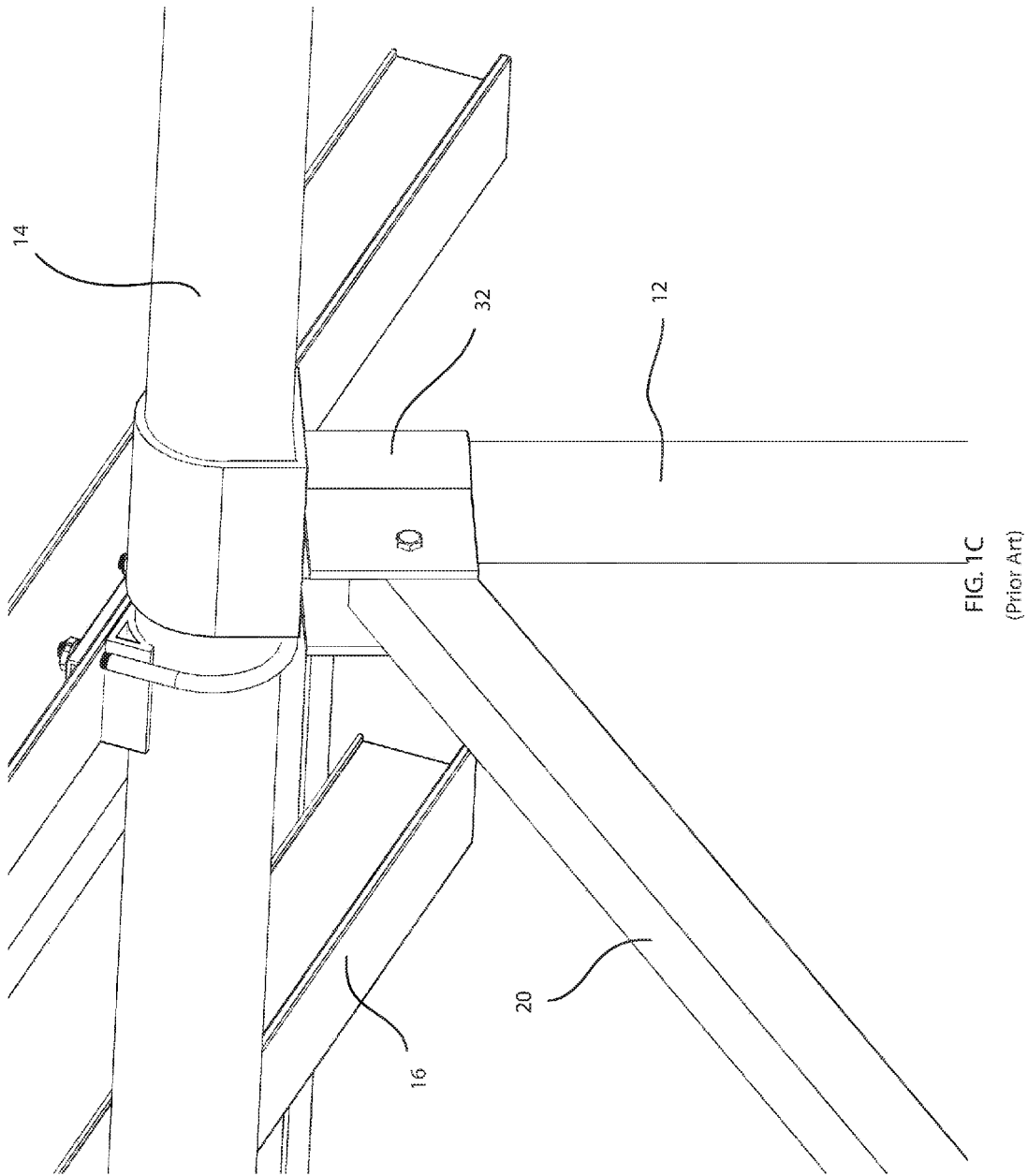
FIG. 1C depicts a perspective view of a wind brace connection location of the solar array support structure of FIGS. 1A and 1B.

It should be understood that the telescopic nature of the wind brace 118 may allow the ends to be pre-stamped during manufacture prior to erecting the solar array support structure 100. This is unlike prior art wind braces 20 that need to be cut on the job in the field and therefore cannot include pre-stamped ends. In turn, the stamped ends 124, 126 may allow for the connector halves 132, 134 to be much simpler in design and require much less material than prior art connectors 32 shown in FIGS. 1A, 1B and 1C. Thus, the connectors 32 of the prior art must be capable of accepting the much wider wind brace end, as shown in FIG. 1C. This requires a wider and larger connector 32 that may have a greater material cost than the connector halves 132, 134. Further, because the prior art wind braces 20 are cut in the field, no stamping is possible. Therefore, the cut end of the prior art wind brace 20 must be connectable in the connector 32. In light of this, prior art wind braces typically have a square or rectangular cross section in order to fit securely within the connector 32. The stamped ends 124, 126 of the wind braces 118 taught herein allows for the wind brace 118 to have a circular cross section that may be advantageous in many situations.

Furthermore, other connecting means are contemplated in addition to the embodiment disclosed herein. While the invention contemplates the stamped ends 124, 126 with the connector halves 132, 134, other connecting means are contemplated. For example, the first and second portions of one embodiment of a telescopic wind brace may have a square or rectangular cross section, and be connected to a vertical support column similar to the manner provided by the prior art in FIGS. 1A, 1B, and 1C. Bolts, clamps, clasps, ties or any other fastening means are also contemplated that are capable of retaining the telescopic wind brace 118 in the appropriate position between the rear and front support columns 114, 116. In one embodiment, a connector may have a single component, rather than two halves. The connector may be bent around a column, and include two adjacent flanges similar to the flanges 138a, 138b. In other words, the second flanges 140a, 140b would not exist in this embodiment, and the connector would be a single component that extends in a substantially complete circle around the columns 114, 116.

The telescopic brace 114 may also be utilized in other locations on the solar foundation. For example, a first telescopic brace 114 may extend from an upper portion of a first rear column 114, to a bottom portion of a second rear column 114. A second telescopic brace 114 may extend from a bottom portion of the first rear column 114, to a top portion of the second rear column 114. This X-shaped arrangement may further strengthen the structural integrity of the solar array support structure 100 system. Furthermore, this X-shape may be accomplished with four separate telescopic braces 114 that are held in place at a midpoint of the X by a structural connector component (not shown).

Figure 5A:
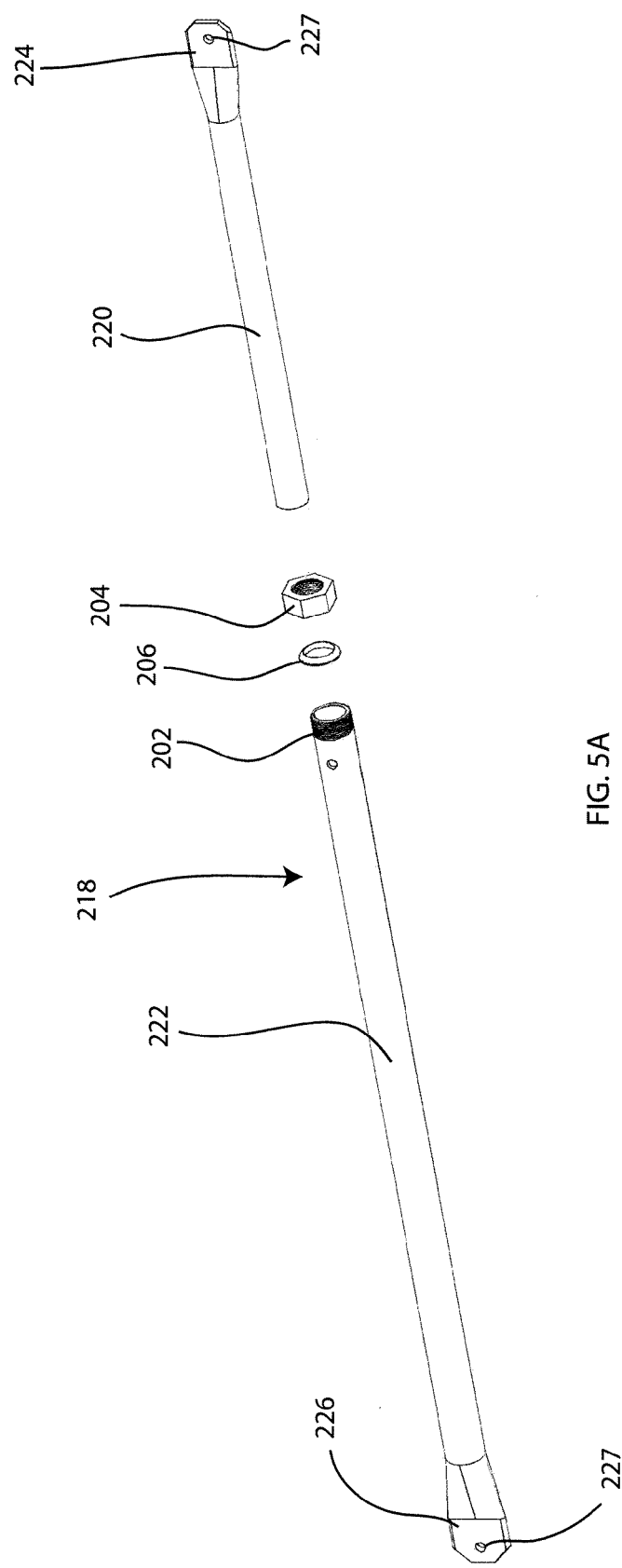
FIG. 5A depicts an exploded view of a telescopic wind brace in accordance with another embodiment.
Figure 5B:
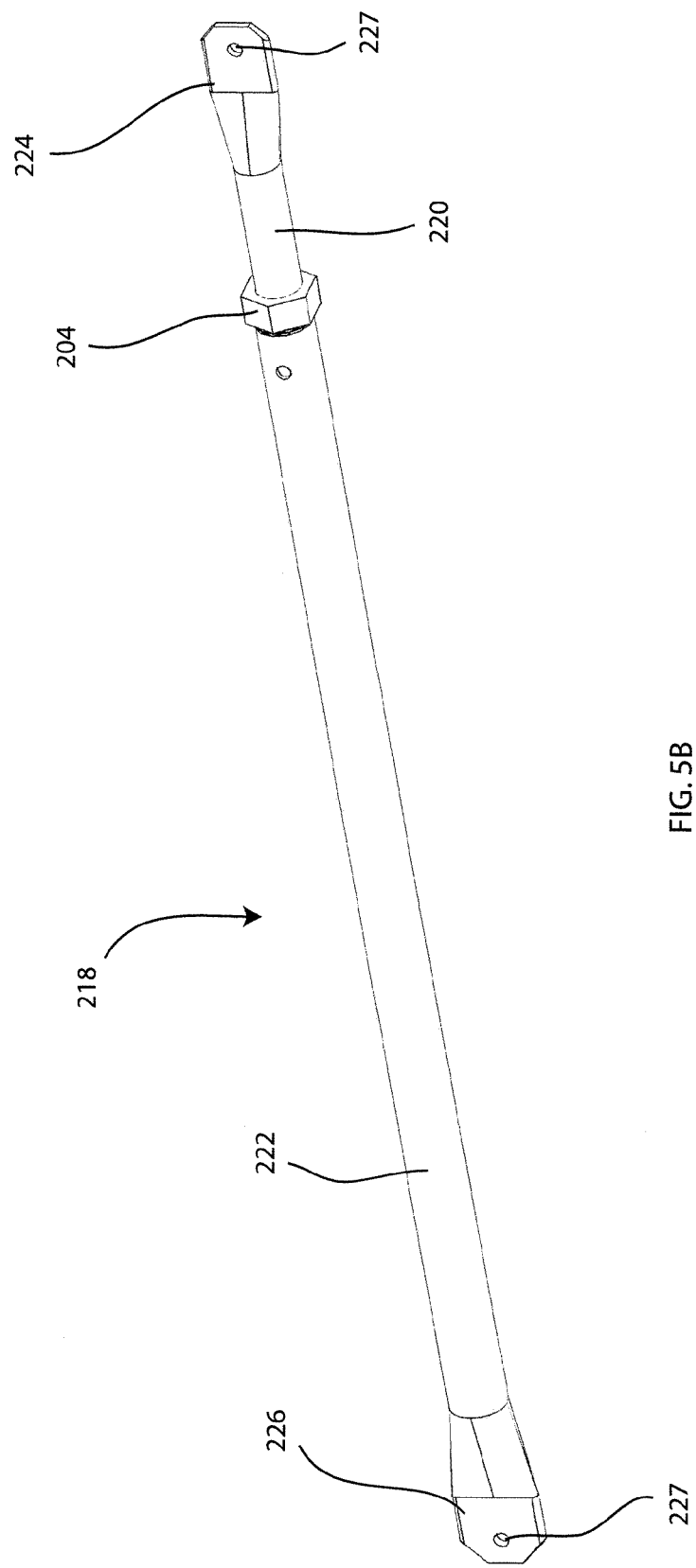
FIG. 5B depicts a perspective view of the telescopic wind brace of FIG. 5.
Figure 5C:
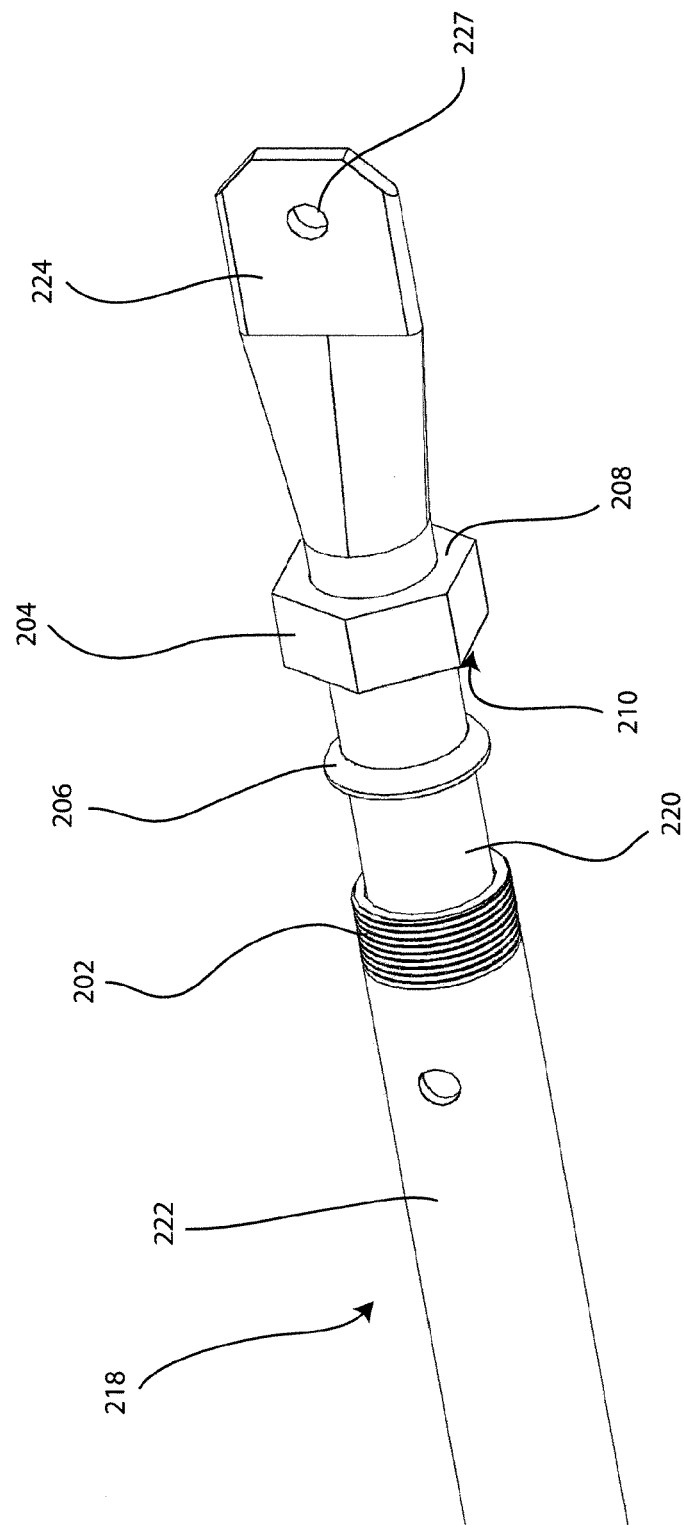
FIG. 5C depicts a perspective view of a compression ring and compression nut arrangement of the telescopic wind brace of FIGS. 5A-5B prior to compression.
Figure 5D:
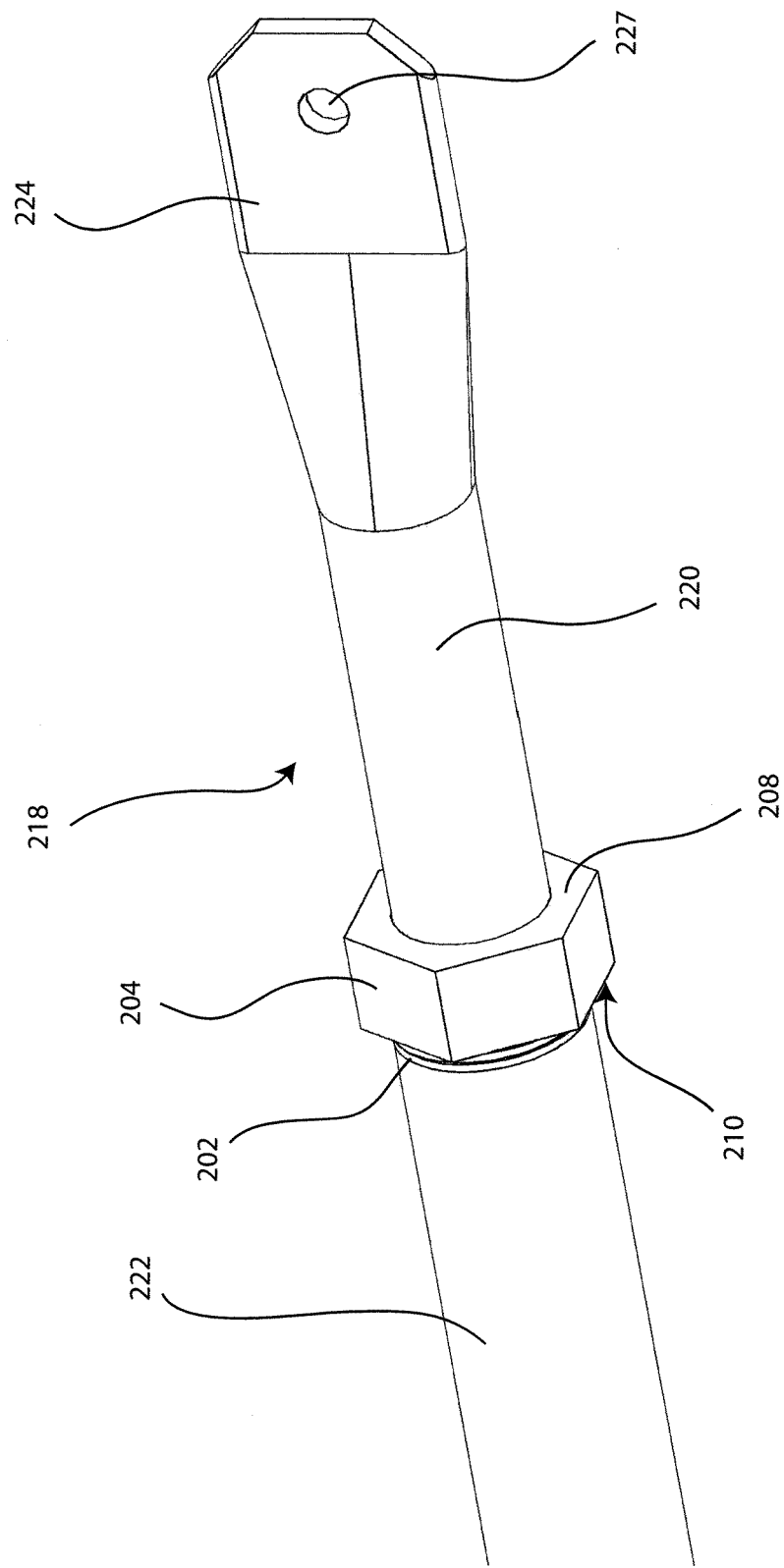
FIG. 5D depicts a perspective view of a compression ring and compression nut arrangement of the telescopic wind brace of FIGS. 5A-5C after compression.

Another embodiment of a wind brace 218 is shown in FIGS. 5A-5D. In this embodiment, the length of the wind brace 218 is also adjustable. The wind brace 218 includes a first tubular portion 220 similar to the first tubular portion 120 and a second tubular portion 222 similar to the second tubular portion 122. The first tubular portion 220 includes a smaller circumference cross section to allow it to slide into the second tubular portion 222 in a similar manner described with respect to the wind brace 118. The first tubular portion 220 and the second tubular portion 222 each include stamped ends 224, 226 having openings 227, like the stamped ends 124, 126 described hereinabove. Unlike the wind brace 118, the second tubular portion includes a threaded end 202 opposite the second stamped end 226. This threaded end 202 may be configured to receive a compression nut 204. The compression nut 204 may be made of brass or copper, for example, and may include beveled edges. The compression nut 204 may be configured to compress a compression ring 206 against the first tubular portion 220 as the nut 204 is screwed onto the threaded end 202 in order to securely retain the first tubular portion 220 at a desired distance within the second tubular portion 222. FIGS. 5C-5D shows an example of a mechanism for this compression. As the compression nut 204 is screwed onto the threads 202, a right side 208 of the compression nut 204 begins to compress the compression ring 206, biasing it between the compression nut 204, the end of the threaded end 202, and the first tubular portion 220. In other words, the right side 208 of the compression nut 204 is not threaded, and has an opening that has similar dimensions to the first tubular portion 220. The left side 210 of the compression nut 204 has threads that are configured to engage the threaded end 202. This configuration allows for the wind brace 218 to be adjustable in length without having to drill holes into the wind brace 218, as would be required in the wind brace 118.

Referring back to FIGS. 2A and 2B, it should be understood that the horizontal beams 108, 110 and the vertical columns 114, 116 of the solar array support structure 100 may be manufactured from aluminum or steel or other like materials and may have generally circular cross sections, as shown in the Figures. Furthermore, the solar panels 106 may rest on a plurality of rails 16 that rest above the horizontal beams 108, 110. Further, as shown, the horizontal beams 108, 110 may not rest exactly horizontally with respect to the ground. The beams may rest at a slight angle to follow land contours. For example, the beams 108, 110 may slope anywhere between 0-20 degrees. The horizontal beams 108, 110 and the vertical columns 114, 116 may be hollow. However, the embodiment shown is not limiting. For example, the mounting structure may comprise columns, beams and rails having rectangular or square cross sections. Furthermore, the terms "rail" and "column" are used for illustrative purposes to describe the horizontal beams 108, 110 and the vertical columns 114, 116. It should be understood that these components of the solar array support structure 100 may also be referred to as bars, rails, poles, shafts, pipes, tubes, beams and the like.

Whatever the construction of the solar array support structure 100, the vertical columns 114, 116 are configured to hold it above the ground 102 when the solar array support structure 100 is installed. The vertical columns 114, 116 may also arranged in pairs, each pair comprising one of the front support columns 116 and one of the rear support columns 114. Each pair may be located at the same point along the length of the solar array support structure 100. While the support columns 114, 116 are shown having a circular cross section, the support columns 114, 116 may also have square or rectangular cross sections or the like. These embodiments are exemplary and should not be interpreted as limiting in any way.

These vertical columns 114, 116 may also include helical drives (not shown) at the rooted end to enable the columns 114, 116 to be driven into the ground 102 through rotation during the installation of the solar array support structure 100. These helical drives may also support the solar array support structure 100 in order to bear the vertical loading caused by the wind (both downward and upward), snow, weight of the structure, and the like. Alternately, driven piles or concrete masses may be utilized to sustain the vertical loading on these vertical columns 114, 116. It should be understood that none of these embodiments are meant to be limiting, and that the invention is only limited to that which is claimed.

Elements of the embodiments have been introduced with either the articles "a" or "an." The articles are intended to mean that there are one or more of the elements. The terms "including" and "having" and their derivatives are intended to be inclusive such that there may be additional elements other than the elements listed. The conjunction "or" when used with a list of at least two terms is intended to mean any term or combination of terms. The terms "first" and "second" are used to distinguish elements and are not used to denote a particular order.

While the invention has been described in detail in connection with only a limited number of embodiments, it should be readily understood that the invention is not limited to such disclosed embodiments. Rather, the invention can be modified to incorporate any number of variations, alterations, substitutions or equivalent arrangements not heretofore described, but which are commensurate with the spirit and scope of the invention. Additionally, while various embodiments of the invention have been described, it is to be understood that aspects of the invention may include only some of the described embodiments. Accordingly, the invention is not to be seen as limited by the foregoing description, but is only limited by the scope of the appended claims.

I claim:

1. A solar array support structure comprising:
   a first vertical column having a first height extending into a ground;
   a second vertical column extending into the ground and having a second height, the second height being taller than the first height;
   a first horizontal beam attached to and extending across a top of the first vertical column;
   a second horizontal beam attached to and extending across a top of the second vertical column;
   at least one solar panel attached above the first horizontal beam and the second horizontal beam in a plane that extends between the first horizontal beam and the second horizontal beam; and
   a telescopic wind brace extending between an upper portion of the first vertical column and a lower portion of the second vertical column.

2. The solar array support structure of claim 1, wherein the telescopic wind brace has a length having a circular cross section.

3. The solar array support structure of claim 2, wherein the telescopic wind brace has a first stamped end and a second stamped end, each of the first and second stamped ends including a stamped end opening.

4. The solar array support structure of claim 3, further comprising a first pair of connector halves attached around each of the first vertical column, the first pair of connector halves each having a semi-annular portion extending between two radial flanges each extending radially outwardly from the semi-annular portion, each of the two radial flanges having a radial flange opening, wherein the first stamped end of the telescopic wind brace is connected at the first vertical column with the first pair of connector halves.

5. The solar array support structure of claim 4, wherein the first stamped end is connected between one radial flange from each of the connector halves of the first pair of connector halves with a bolt.

6. The solar array support structure of claim 5, further comprising a column end cap surrounding the upper portion of the first vertical column, the column end cap attaching the first vertical column to the first horizontal beam, wherein the second stamped end is connected to the column end cap.

7. The solar array support structure of claim 1, wherein each of the telescopic wind brace includes a first tubular portion and a second tubular portion, the first tubular portion having smaller dimensions than the second tubular portion such that the first tubular portion is slidably insertable within the second tubular portion.

8. The solar array support structure of claim 7, wherein the first tubular portion and the second tubular portion are movably retained at a particular telescopic length with a bolt.

9. The solar array support structure of claim 7, wherein the first tubular portion and the second tubular portion are movably retained at a particular telescopic length with a compression ring and a compression nut.

10. A solar array support structure comprising:
    a first set of vertical columns each having a first height and aligned in a first row and each extending into a ground;
    a second set of vertical columns each having a second height and aligned in a second row, the second height being taller than the first height, and each extending into the ground;
    a first horizontal beam extending across a top of the first set of vertical columns;
    a second horizontal beam extending across a top of the second set of vertical columns;
    a solar array mounted above the first horizontal beam and the second horizontal beam in a plane that extends between the first horizontal beam and the second horizontal beam; and
    a plurality of wind braces mounted between the first set of vertical columns and the second set of vertical columns having a length, the plurality of wind braces each having a means for releasably and securably adjusting the length.

11. The solar array support structure of claim 10, wherein each of the plurality of wind braces are attached at an upper portion of one vertical column from the first set of vertical columns and at a lower portion of one vertical column from the second set of vertical columns.

12. The solar array support structure of claim 10, wherein each of the plurality of wind braces has a length having a circular cross section.

13. The solar array support structure of claim 12, wherein each of the plurality of wind braces has a first stamped end and a second stamped end, each of the first and second stamped ends including a stamped end opening.

14. The solar array support structure of claim 13, further comprising a first pair of connector halves attached around each of the first set of vertical columns, each of the first pair of connector halves having a semi-annular portion extending between two radial flanges each extending radially outwardly from the semi-annular portion, each of the two radial flanges having a radial flange opening, wherein the first stamped end of each of the plurality of wind braces is connected at a vertical column from the first set of vertical columns with the first pair of connector halves, wherein the first stamped end is connected between one radial flange from each of the first pair of connector halves with a bolt.

15. The solar array support structure of claim 14, further comprising a column end cap surrounding the upper portion of the first vertical column, the column end cap attaching the first vertical column to the first horizontal beam, wherein the second stamped end is connected to the column end cap.

16. The solar array support structure of claim 10, wherein each of the plurality of wind braces includes a first tubular portion and a second tubular portion, the first tubular portion having a smaller dimension than the second tubular portion such that the first tubular portion is slidably insertable within the second tubular portion.

17. The solar array support structure of claim 16, wherein the first tubular portion and the second tubular portion of each of the plurality of wind braces are movably retained at a particular telescopic length with a bolt.

18. The solar array support structure of claim 16, wherein the first tubular portion and the second tubular portion of each of the plurality of wind braces are movably retained at a particular telescopic length with a compression ring and a compression nut.

19. A solar array support structure comprising:
a first vertical column extending into a ground;
a second vertical column extending into the ground; and
a telescopic brace located between the first vertical column and the second vertical column, the telescopic wind brace having a first stamped end and a second stamped end, each of the first and second stamped ends including a stamped end opening, the telescopic wind brace including a first tubular portion and a second tubular portion each having a length with a circular cross section, the first tubular portion having a smaller dimension than the second tubular portion such that the first tubular portion is slidably insertable within the second tubular portion.

20. The solar array support structure of claim 19, further comprising a first pair of connector halves attached around the first vertical column and attaching the telescopic brace to the first vertical column, the first pair of connector halves each having a semi-annular portion extending between two radial flanges, the two radial flanges each extending radially outwardly from the semi-annular portion and having a radial flange opening.

21. The solar array support structure of claim 20, further comprising a column end cap surrounding an upper portion of the first vertical column, the column end cap attaching the first vertical column to a first horizontal beam, wherein the second stamped end is connected to the column end cap.

* * * * *